(12) United States Patent
Kim et al.

(10) Patent No.: US 12,223,050 B2
(45) Date of Patent: Feb. 11, 2025

(54) APPARATUS FOR ANALYZING NON-INFORMATIVE FIRMWARE AND METHOD USING THE SAME

(71) Applicant: ELECTRONICS AND TELECOMMUNICATIONS RESEARCH INSTITUTE, Daejeon (KR)

(72) Inventors: Dae-Won Kim, Daejeon (KR); Sang-Su Lee, Daejeon (KR); Yong-Je Choi, Daejeon (KR); Byeong-Cheol Choi, Daejeon (KR); Dong-Wook Kang, Daejeon (KR); Yang-Seo Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 182 days.

(21) Appl. No.: 18/049,523

(22) Filed: Oct. 25, 2022

(65) Prior Publication Data

US 2023/0142407 A1    May 11, 2023

(30) Foreign Application Priority Data

Nov. 9, 2021 (KR) .................. 10-2021-0153073

(51) Int. Cl.
*G06F 21/57* (2013.01)
*G06F 9/30* (2018.01)
(Continued)

(52) U.S. Cl.
CPC .......... *G06F 21/572* (2013.01); *G06F 9/3005* (2013.01); *G06F 9/345* (2013.01); *G06F 9/3836* (2013.01)

(58) Field of Classification Search
CPC ...... G06F 21/572; G06F 9/3005; G06F 9/345; G06F 9/3836
See application file for complete search history.

(56) References Cited

U.S. PATENT DOCUMENTS

| 8,443,171 | B2 * | 5/2013 | Morris | G06F 9/30061 712/226 |
| 9,384,003 | B2 * | 7/2016 | Mizuno | G06F 9/30058 |
| (Continued) | | | | |

FOREIGN PATENT DOCUMENTS

| KR | 10-2010-0073124 A | 7/2010 |
| KR | 10-1202650 B1 | 11/2012 |
| (Continued) | | |

OTHER PUBLICATIONS

Mi-Hee Kim, "Core Strategies for Risk Management through Supply Chain Attack Case Analysis," IT Daily (http://www.itdaily.kr), Oct. 31, 2021.

(Continued)

*Primary Examiner* — Aurel Prifti (57) ABSTRACT

Disclosed herein are an apparatus for analyzing non-informative firmware and a method using the apparatus. The method includes detecting a target instruction for firmware analysis in a memory map in non-informative firmware, generating an analysis list based on memory map information corresponding to the target instruction, and generating a visualized analysis result corresponding to the firmware by grouping the entries of the analysis list by preset reference bytes.

10 Claims, 8 Drawing Sheets

(51) Int. Cl.
  *G06F 9/345* (2018.01)
  *G06F 9/38* (2018.01)

(56) References Cited

U.S. PATENT DOCUMENTS

| | | | | |
|---|---|---|---|---|
| 9,690,587 | B2* | 6/2017 | Adiga | G06F 9/3806 |
| 9,830,162 | B2* | 11/2017 | LeMay | G06F 9/30054 |
| 10,540,252 | B2* | 1/2020 | Bofferding | G06F 11/3604 |
| 12,135,802 | B2* | 11/2024 | Sangamala | G06F 16/29 |
| 2009/0025083 | A1* | 1/2009 | Dae-Won | H04L 63/145 |
| | | | | 726/23 |
| 2015/0019850 | A1* | 1/2015 | Rivera | G06F 21/572 |
| | | | | 713/1 |
| 2015/0213260 | A1 | 7/2015 | Park | |
| 2016/0132322 | A1* | 5/2016 | Jones | G06F 8/654 |
| | | | | 717/168 |
| 2017/0116417 | A1* | 4/2017 | Jhi | G06F 21/566 |
| 2018/0349129 | A1 | 12/2018 | Ju | |
| 2019/0163902 | A1* | 5/2019 | Reid | G06F 12/1009 |
| 2019/0166158 | A1* | 5/2019 | Grocutt | G06F 21/53 |
| 2019/0384370 | A1* | 12/2019 | Kim | G06N 3/065 |
| 2020/0012794 | A1* | 1/2020 | Saldanha | G06F 21/568 |
| 2020/0310812 | A1* | 10/2020 | Ishii | G06F 9/3844 |
| 2020/0409704 | A1* | 12/2020 | Mishaeli | G06F 9/30196 |
| 2021/0216317 | A1* | 7/2021 | Schuttenberg | G06F 9/3838 |
| 2021/0294895 | A1* | 9/2021 | Lee | G06F 21/568 |
| 2022/0019513 | A1* | 1/2022 | Levy | G09B 19/0053 |
| 2022/0108013 | A1* | 4/2022 | Favor | G06F 12/1063 |
| 2022/0197657 | A1* | 6/2022 | Soundararajan | G06F 9/3806 |
| 2022/0245838 | A1* | 8/2022 | Wu | G06F 40/289 |
| 2023/0034741 | A1* | 2/2023 | Sangamala | G06F 16/29 |

FOREIGN PATENT DOCUMENTS

| | | |
|---|---|---|
| KR | 10-2014-0062959 A | 5/2014 |
| KR | 10-1445634 B1 | 10/2014 |
| KR | 10-2017-0048060 A | 5/2017 |
| KR | 10-1972825 B1 | 4/2019 |
| KR | 10-1995176 B1 | 7/2019 |
| KR | 10-2020-0056647 A | 5/2020 |
| KR | 10-2020-0090837 A | 7/2020 |

OTHER PUBLICATIONS

Daewon Kim et al, "Trends in Supply-Chain Security Technologies," Electronics and Telecommunications Trends, Aug. 1, 2020.

* cited by examiner

| SEQUENCE NUMBER | GROUP BRANCH | GROUP BRANCH MAP |
|---|---|---|
| Seq. No. | G_B | G_B_Map |
| 1 | | |

←——— BRANCH STEP ———→ (spanning GROUP BRANCH and GROUP BRANCH MAP)

| Seq.No. | G_B1 | G_B1_Map | G_B2 | G_B2_Map | G_B3 | G_B3_Map |
|---|---|---|---|---|---|---|
| 1 | FFFF 0000 | | | | | |
| 2 | | | FFFF 002C | | | |
| 3 | | | | | FFFF 1DD4 | |
| 4 | | | | | | 0000 1000 |
| 5 | | | | | FFFF 1CC4 | |
| 6 | | | | | FFFF 0788 | |
| 7 | | | | | | C000 0000 |
| 8 | | | | 2000 4000 | | |
| 9 | | | | | FFFF 1C64 | |
| 10 | | | | | | FFFF FFFF |
| 11 | | | | A1000 000 | | |
| 12 | | | | | FFFF 1C94 | |
| 13 | | | | | | FFFF FFFF |
| 14 | | | | | FFFF 1100 | |
| 15 | | | | | | A100 0668 |
| 16 | | | | | | A100 05E8 |
| 17 | | | | | | A100 0568 |
| 18 | | | | | | A100 0468 |
| 19 | | | | | | A100 0468 |
| 20 | | | | | | A100 1668 |
| 21 | | | | C000 0000 | | |
| 22 | | | | 0000 4000 | | |

APPARATUS FOR ANALYZING NON-INFORMATIVE FIRMWARE AND METHOD USING THE SAME

CROSS REFERENCE TO RELATED APPLICATION

This application claims the benefit of Korean Patent Application No. 10-2021-0153073, filed on Nov. 9, 2021, which is hereby incorporated by reference in its entirety into this application.

BACKGROUND OF THE INVENTION

1. Technical Field

The present invention relates generally to technology for analyzing non-informative firmware, and more particularly to technology for providing unidentified chip detection information through firmware analysis without using a physical detection method.

2. Description of the Related Art

Recently, security threats have been posed by an unidentified chip suspected of being a spy chip. In one instance, an unidentified chip was found in servers produced by the supply chain of a certain server manufacturer in the U.S., and the effects thereof were analyzed by several U. S. companies, including Amazon, Apple, and the like.

Certain U.S. media reported that Apple destroyed thousands of these servers in the data center thereof and that Amazon sold the data center located in China.

Because this unidentified chip was covered by other components and is as tiny as about the size of a sharp pencil lead, it was difficult to discover the same through visual detection or physical detection using images. Accordingly, only after security issues by the unidentified chip were raised, the sever components were disassembled, and the chip was discovered using a microscope.

Accordingly, technology for overcoming limitations in physical detection of an unidentified chip, which may pose a security threat, is required.

DOCUMENTS OF RELATED ART (Patent Document 1) Korean Patent No. 10-1995176, registered on Jun. 25, 2019 and titled "Method and system for reverse engineering using big data based on dynamic context of program".

SUMMARY OF THE INVENTION

An object of the present invention is to provide unidentified chip detection information through firmware analysis rather than through a physical detection method.

Another object of the present invention is to perform automated analysis in order to solve the problem with manual work in reverse engineering, which consumes a lot of time and expenses when non-informative firmware, from which a string related to a hint on a memory map is deleted, is analyzed.

A further object of the present invention is to analyze a memory map in firmware, thereby overcoming limitations in physical detection of an unidentified chip, which may pose a security threat.

Yet another object of the present invention is to compare a memory map acquired using a visualized result and analysis list with an already known normal memory map, to compare the same with a database in which data is accumulated through training, and to track an actual unidentified chip using the visualized result and analysis list.

In order to accomplish the above objects, a method for analyzing non-informative firmware according to the present invention includes detecting a target instruction for firmware analysis in a memory map in non-informative firmware, generating an analysis list based on memory map information corresponding to the target instruction, and generating a visualized analysis result corresponding to the firmware by grouping entries of the analysis list by preset reference bytes.

Here, the target instruction may be a non-informative instruction in which a string related to a memory map hint is not included.

Here, the target instruction may include a first instruction for executing a branch and a second instruction in which a specific value in a predefined format is used for a register operation without any description.

Here, the analysis list may be generated by inputting a branch target address of the first instruction and the specific value in the predefined format used in the second instruction according to a sequence order.

Here, the specific value in the predefined format may be a 8-digit or 4-digit value corresponding to a hexadecimal number.

Here, the method may further include detecting an unidentified chip based on the visualized analysis result.

Here, the unidentified chip may be detected using at least one of a method of comparing a memory map included in the visualized analysis result with a normal memory map, a method of comparing the memory map included in the visualized analysis result with a memory map database accumulated based on training, or a method of tracking an unidentified chip using the memory map included in the visualized analysis result, or a combination thereof.

Here, the visualized analysis result may be generated by grouping the entries of the analysis list by upper four bytes.

Also, an apparatus for analyzing non-informative firmware according to an embodiment of the present invention includes a processor for detecting a target instruction for firmware analysis in a memory map in non-informative firmware, generating an analysis list based on memory map information corresponding to the target instruction, and generating a visualized analysis result corresponding to the firmware by grouping entries of the analysis list by preset reference bytes; and memory for storing the analysis list and the analysis result.

Here, the target instruction may be a non-informative instruction in which a string related to a memory map hint is not included.

Here, the target instruction may include a first instruction for executing a branch and a second instruction in which a specific value in a predefined format is used for a register operation without any description.

Here, the analysis list may be generated by inputting a branch target address of the first instruction and the specific value in the predefined format used in the second instruction according to a sequence order.

Here, the specific value in the predefined format may be a 8-digit or 4-digit value corresponding to a hexadecimal number.

Here, the processor may detect an unidentified chip based on the visualized analysis result.

Here, the processor may detect the unidentified chip using at least one of a method of comparing a memory map included in the visualized analysis result with a normal memory map, a method of comparing the memory map included in the visualized analysis result with a memory map database accumulated based on training, or a method of tracking an unidentified chip using the memory map included in the visualized analysis result, or a combination thereof.

Here, the visualized analysis result may be generated by grouping the entries of the analysis list by upper four bytes.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

Figure 2:
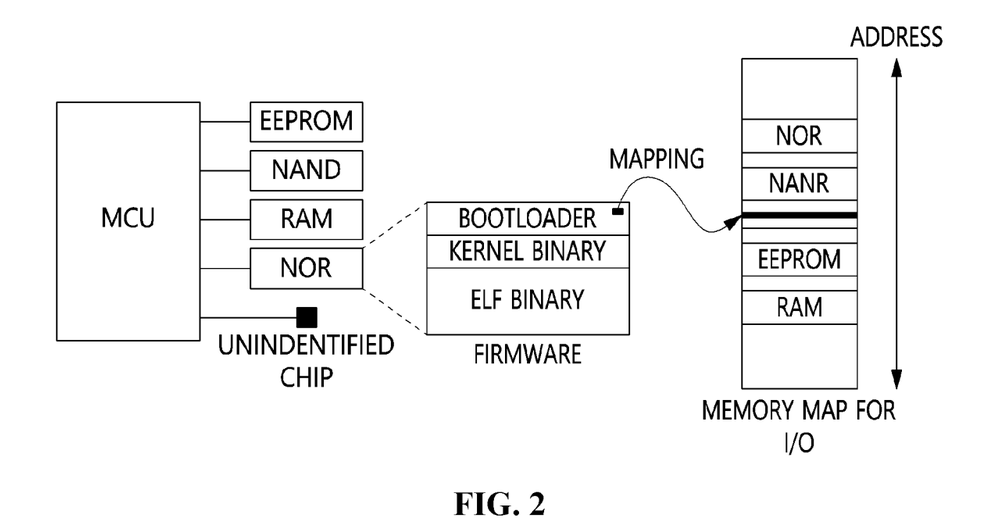
FIG. 2 is a view illustrating an example of the concept of unidentified chip detection through firmware analysis according to the present invention.

In order to drive a chip in a device such as a server, it is necessary to assign an address for accessing the chip in a Micro Controller Unit (MCU) as illustrated in FIG. 2. Accordingly, even an unidentified chip, which may pose a security threat due to the possibility of being exploited for malicious behavior, is required to be assigned a chip access address in the MCU in order to drive the same.

Here, the central processing unit of an embedded system corresponds to a Micro Controller Unit (MCU), and in embedded systems, a chip access address may be assigned by firmware, as illustrated in FIG. 2.

Referring to FIG. 2, a task for assigning a chip access address may be performed in a first bootloader, a second bootloader, a kernel binary, or the like, and the addresses assigned in the first bootloader, the second bootloader, and the kernel binary become increasingly detailed in the order in which they are listed.

Currently, a task for analyzing a firmware memory map is manually performed by reverse engineering experts, and a lot of time and expenses are consumed therefor. Also, it is not easy for reverse engineering experts to perform manual analysis when a string giving a hint on a memory map is not present in firmware.

Accordingly, the present invention intends to propose an automated firmware analysis method based on the above-described concept in order to solve a problem with manual work for which a lot of time and expenses are consumed when non-informative firmware, in which a string giving a hint on a memory map is not present, is analyzed. Simply, this method is implemented in a way that helps detect an unidentified chip by analyzing assignment of a chip access address (referred to as a memory map hereinafter) in firmware. Hereinafter, this method will be described in detail with reference to the accompanying drawings.

Figure 1:
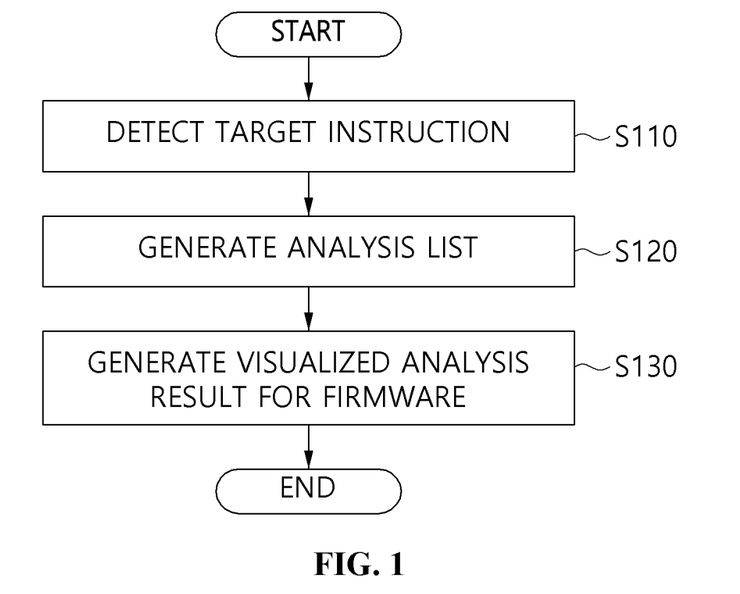
FIG. 1 is a flowchart illustrating a method for analyzing non-informative firmware according to an embodiment of the present invention.

FIG. 1 is a flowchart illustrating a method for analyzing non-informative firmware according to an embodiment of the present invention.

Referring to FIG. 1, in the method for analyzing non-informative firmware according to an embodiment of the present invention, a target instruction for firmware analysis is detected in a memory map in non-informative firmware at step S110.

Here, the target instruction may be a non-informative instruction in which a string giving a hint on a memory map is not included.

Here, a bootloader may include many other values unrelated to assignment of a chip access address. Therefore, an automated memory map extraction process, which follows a branch from the start code of the bootloader based on specific values determined to correspond to assignment of an address for accessing a peripheral device, may be required.

Here, the target instruction may include a first instruction that executes a branch and a second instruction in which a specific value in a predefined format is used for a register operation without any description.

Here, the specific value in a predefined format may be a 8-digit or 4-digit hexadecimal number.

Figure 3:
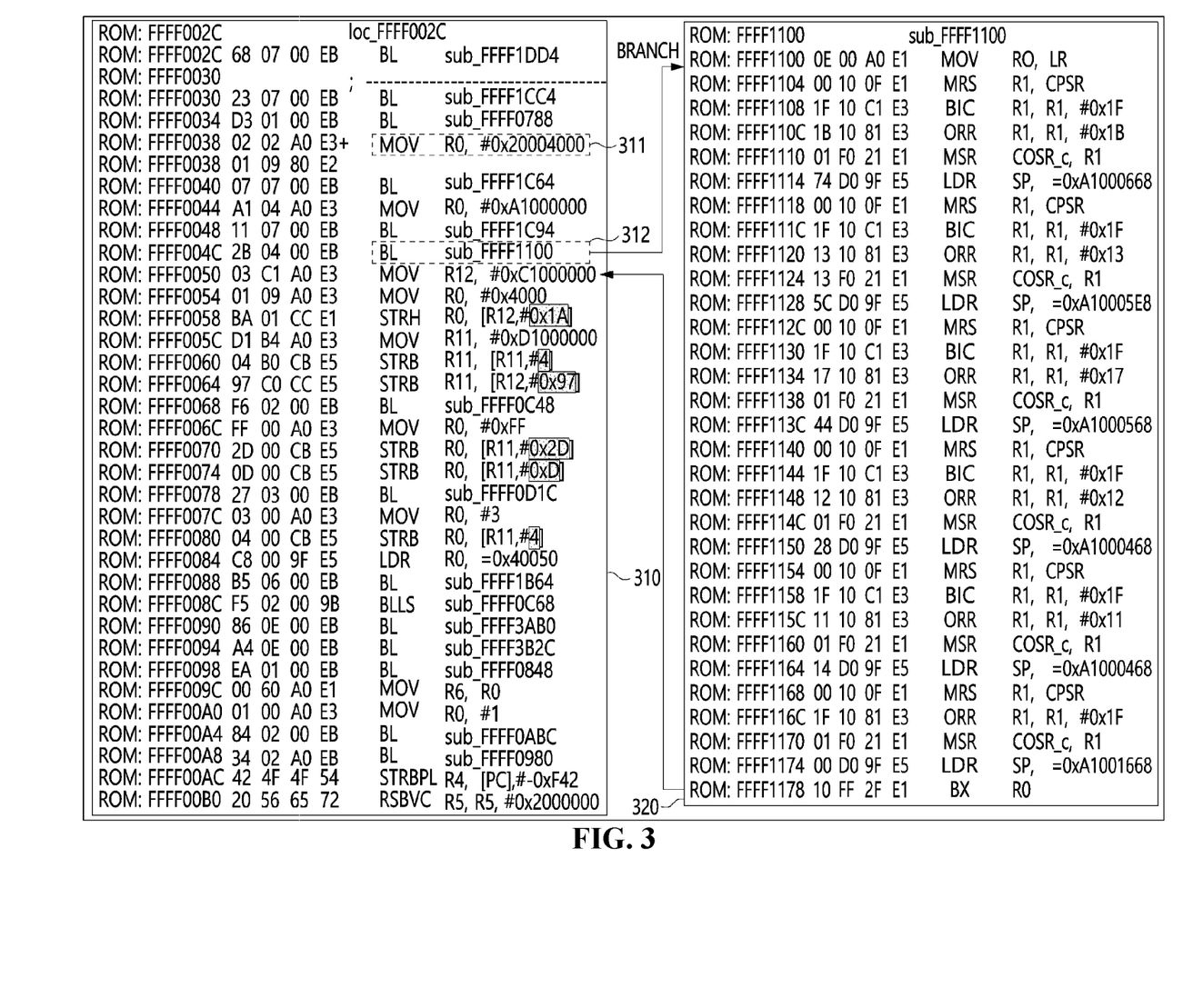
FIG. 3 is a view illustrating an example of a target instruction according to the present invention.

For example, FIG. 3 shows boot code parts 310 and 320 for assigning addresses for accessing peripheral devices and target instructions 311 and 212 included therein in the first bootloader of specific firmware. Referring to the target instructions 311 and 312 illustrated in FIG. 3, it can be seen that the target instructions are instructions in which a memory map hint such as a string is not included.

That is, it can be seen that the first instruction 312 illustrated in FIG. 3 is 'BL sub_FFFF1100', which is a branch instruction for jumping to FFFF1100 corresponding to a target address. Also, it can be seen that the second instruction 311 in the start part of the firmware bootloader is 'MOV R0, #0x20004000' in which specific values that are less likely to be used in a general arithmetic operation (e.g., a hexadecimal number 0x20004000 or a decimal number 536,887,296) are used for a register operation without a description.

Also, in the method for analyzing non-informative firmware according to an embodiment of the present invention, an analysis list is generated based on memory map information corresponding to the target instruction at step S120.

Here, the analysis list may be generated by inputting the branch target address of the first instruction and the specific value in a predefined format used in the second instruction according to the sequence order.

Figure 4:
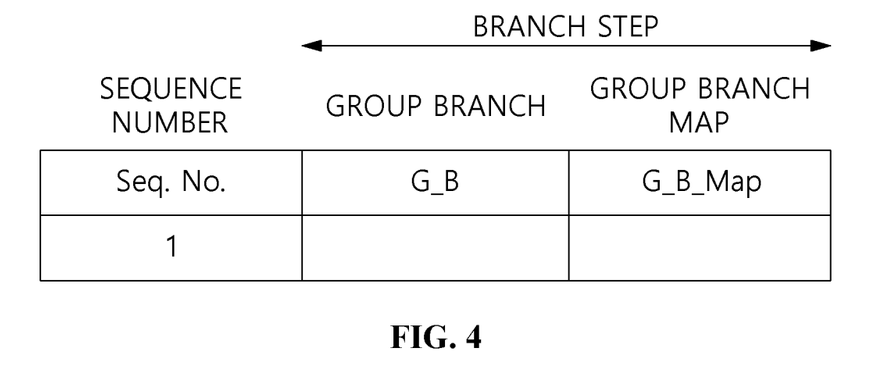
FIG. 4 is a view illustrating an example of an initial state of an analysis list according to the present invention.

For example, FIG. 4 illustrates the initial state of the analysis list before a value is added thereto, and when a target instruction is detected, the value may be added to the analysis list while increasing a sequence number. That is, when a branch instruction is detected or when a specific 4-digit or 8-digit hexadecimal number is included in an instruction, the corresponding values may be added to the analysis list while increasing the sequence number. Here, the branch target address of the branch instruction may be added as the value of a 'group branch', and the specific 4-digit or 8-digit hexadecimal number may be added as the value of a 'group branch map'.

Hereinafter, a process from the start of a bootloader to a branch will be described in more detail with reference to FIG. 5.

Figure 5:
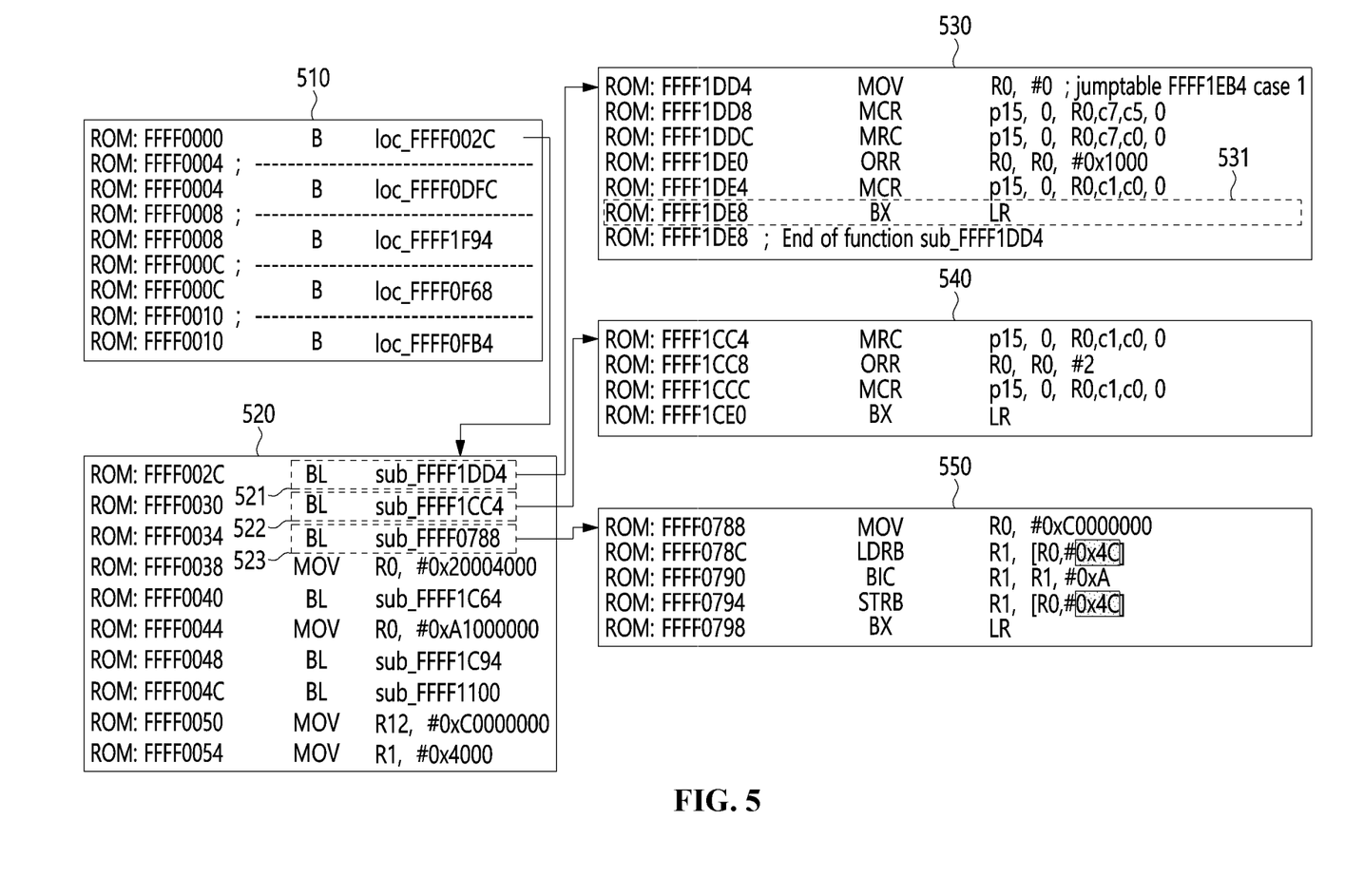
FIG. 5 is a view illustrating an example of a procedure from the start of a bootloader to a branch according to the present invention.

For example, referring to the boot code 510 illustrated in FIG. 5, a branch, such as 'B loc_FFFF002C', occurs from the start of the bootloader, and it can be seen that branching to the boot code part 520 corresponding to the target address of FFFF002C is executed. Referring to the boot code 520 starting from the address FFFF002C, it can be seen that multiple first instructions (that is, branch instructions) are included therein. Here, the process of executing a branch will be described with reference to three first instructions 521 to 523 for convenience of description.

First, the first instruction 521, that is, 'BL sub_FFFF1DD4', is a branch instruction for jumping to the address of FFFF1DD4, and through the branch, code included in the boot code 530 may be executed.

After the boot code 530 is executed, it returns to FFFF0030, which is the address of the next instruction of the first instruction 521, and then a branch by the first instruction 522 may be executed.

Here, an instruction corresponding to RETURN may vary depending on the type of a processing unit, such as Intel, ARM, or the like. In FIG. 5, which is an embodiment of the present invention, 'BX' in the ARM instruction set is used as a return instruction. In the Intel instruction set, 'RET' may be used as a return instruction.

That is, control may return to FFFF0030 through the return instruction RX included in the boot code 530.

Here, the first instruction 522, that is, 'BL sub_FFFF1CC4', is a branch instruction for jumping to the address of FFFF1CC4, and through the branch, code included in the boot code 540 may be executed.

After the boot code 540 is executed, it returns to FFFF0034, which is the address of the next instruction of the first instruction 522, and then a branch by the first instruction 523 may be executed.

Here, the first instruction 523, that is, 'BL sub_FFFF0788', is a branch instruction for jumping to the address of FFFF0788, and through the branch, code included in the boot code 550 may be executed.

After the boot code 550 is executed, it returns to FFFF0038, which is the address of the next instruction of the first instruction 523, and instructions of subsequent code lines may be sequentially executed.

Hereinafter, a process by which an analysis list is generated will be described in more detail with reference to FIG. 6.

First, in the initial state, both a sequence number SEQNO and a branch step in the analysis list are set to 1, as shown in FIG. 4, and the start address of a bootloader may be recorded as the value of a group branch corresponding to the sequence number 1 at step S610.

Subsequently, whether the instruction to be executed is a branch instruction (that is, a first instruction) may be determined at step S620.

When it is determined at step S620 that the instruction is a branch instruction, the address to which control will return after a block of code by the branch instruction is executed, that is, the return address, may be recorded in a virtual stack at step S622.

Subsequently, the sequence number is incremented by 1 and the branch step may be increased in the analysis list at step S624.

Subsequently, the branch target address to which control will jump is recorded as the value of the group branch of the increased branch step at step S626, and the control may jump to the recorded branch target address at step S628.

Subsequently, whether an instruction is present at the branch target address is determined at step S660, and when an instruction is present, step S620 may be performed.

Here, when it is determined at step S660 that no instruction is present, the process of generating the analysis list may be terminated.

Also, when it is determined at step S620 that the instruction is not a branch instruction, whether the instruction is a return instruction may be determined at step S630.

When it is determined at step S630 that the instruction is a return instruction, the branch step is decreased at step S632, the return address recorded in the virtual stack is acquired at step S634, and the control returns to the return address at step S628. Subsequently, step S660 may be performed.

Also, when it is determined at step S630 that the instruction is not a return instruction, whether the instruction is a second instruction, in which a 4-digit or 8-digit hexadecimal number is used for a register operation without a description, may be determined at step S640.

When it is determined at step S640 that the instruction is a second instruction, the sequence number may be incremented by 1 in the analysis list at step S642.

Subsequently, the 4-digit or 8-digit hexadecimal number included in the second instruction is recorded as the value of a group branch map at step S644, and the control may move to the next instruction at step S650.

Also, when it is determined at step S640 that the instruction is not a second instruction, no content is recorded in the analysis list, and the control may move to the next instruction at step S650.

After step S650, step S660 may be performed.

Figure 6:
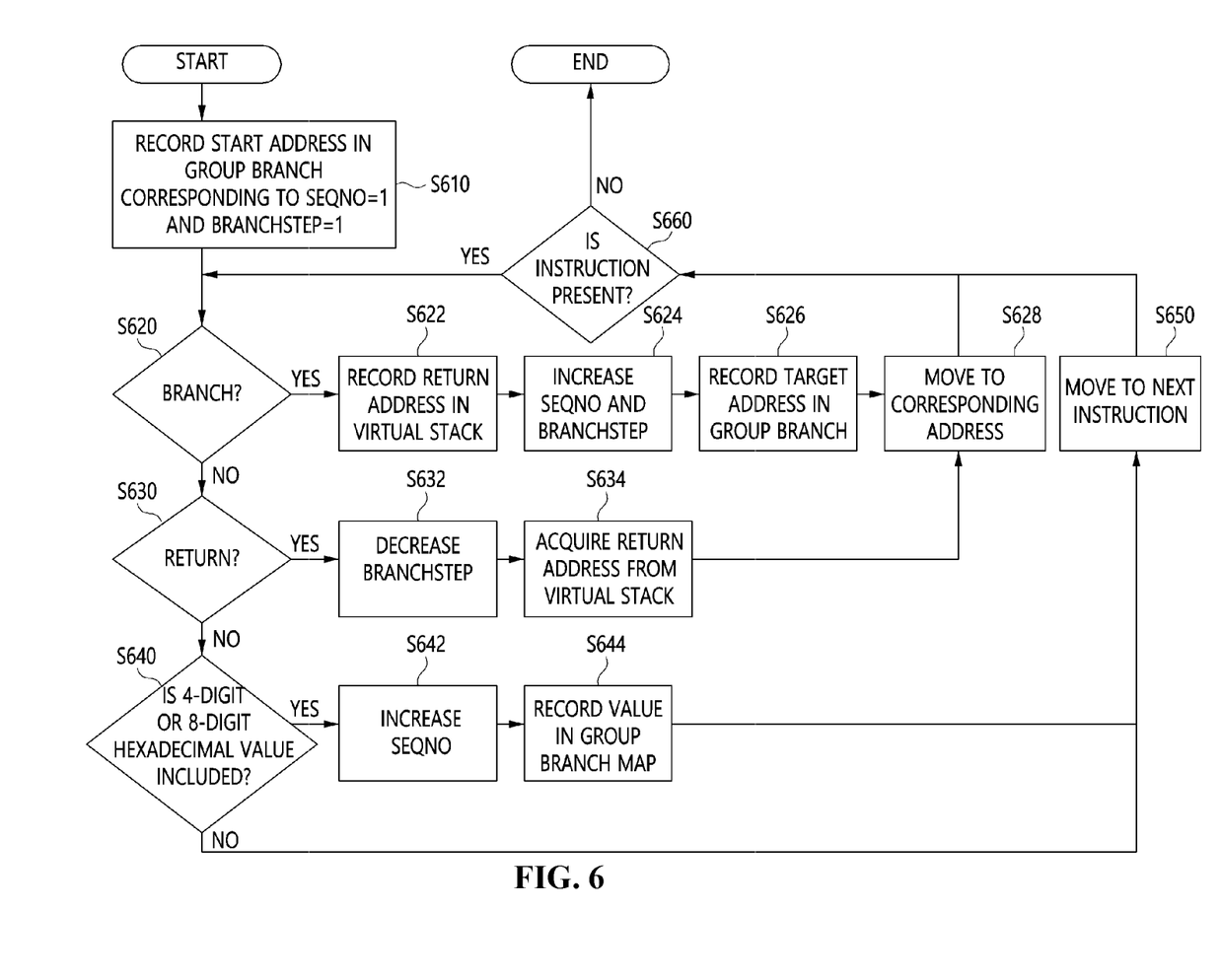
FIG. 6 is a flowchart illustrating in detail a process of generating an analysis list in the process of analyzing non-informative firmware according to an embodiment of the present invention.
Figure 7:
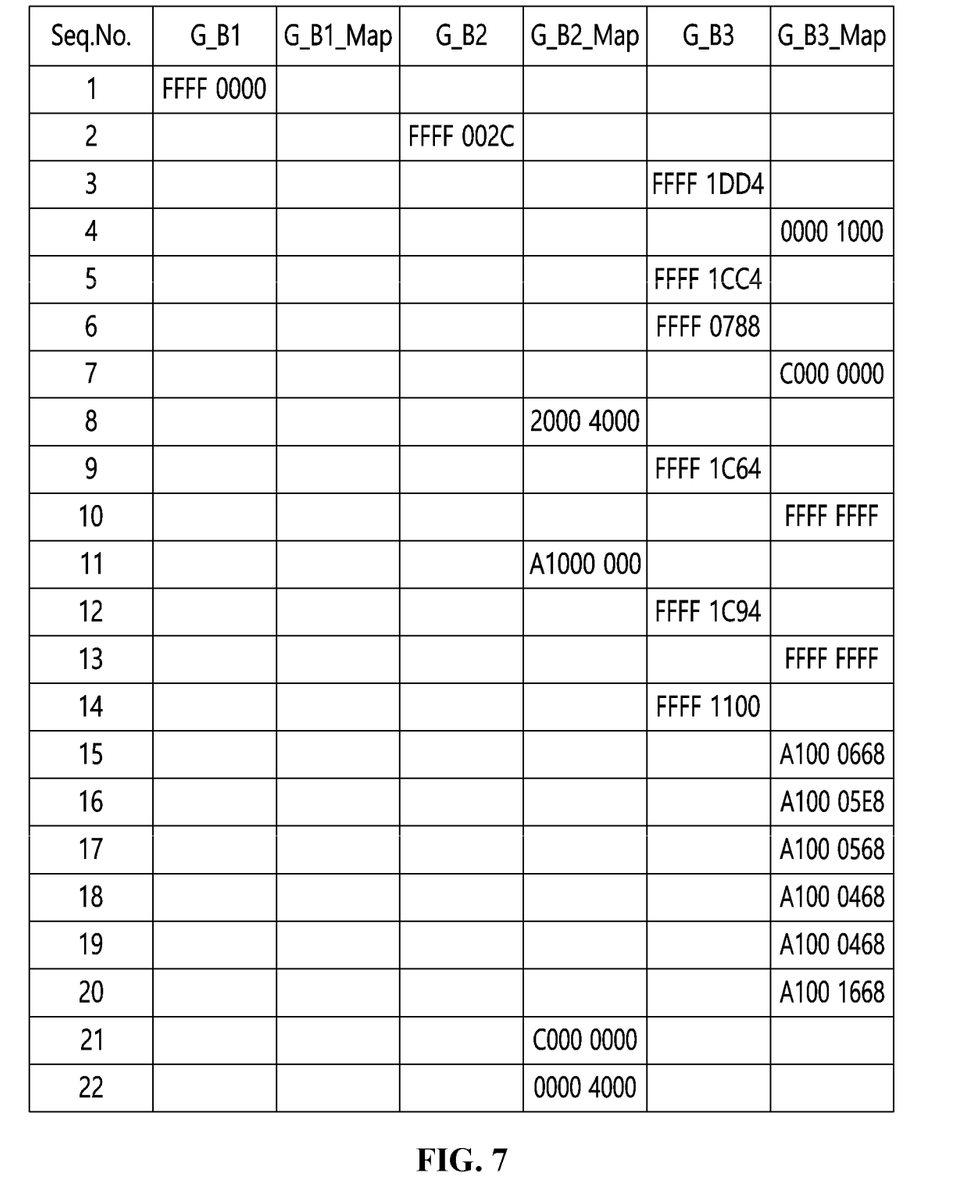
FIG. 7 is a view illustrating an example of an analysis list according to the present invention.

Through the process illustrated in FIG. 6, the analysis list such as that illustrated in FIG. 7 may be generated for the boot code illustrated in FIG. 5.

That is, referring to FIG. 5 and FIG. 7, it can be seen that FFFF0000, which is the start address of the boot code 510 illustrated in FIG. 5, is recorded as the value of G_B1 of the sequence number 1 in the analysis list and that FFFF002C, which is the branch target address, is recorded as the value of G_B2 of the sequence number 2 in the analysis list by a branch instruction 'B loc_FFFF0002C'. Also, it can be seen that 0000 1000 is recorded as the value of G_B3_Map of the sequence number 4 in the analysis list by the second instruction, which is 'ORR, R_0, R0, #0x1000' included in the boot code 530 to which control jumps by a branch. Also, it can be seen that, because the sequence number 8 in the analysis list corresponds to the second instruction in the boot code 520 to which the control returns after the boot code 550 illustrated in FIG. 5 is executed, 2000 4000, which corresponds to 'MOV, R0, #0x20004000, is recorded as the value of G_B2_Map of the decreased branch step.

Also, in the method for analyzing non-informative firmware according to an embodiment of the present invention, entries of the analysis list are grouped by preset reference bytes, whereby a visualized analysis result corresponding to the firmware is generated at step S130.

Here, the visualized analysis result may be generated by grouping the entries of the analysis list by upper 4 bytes.

Figure 8:
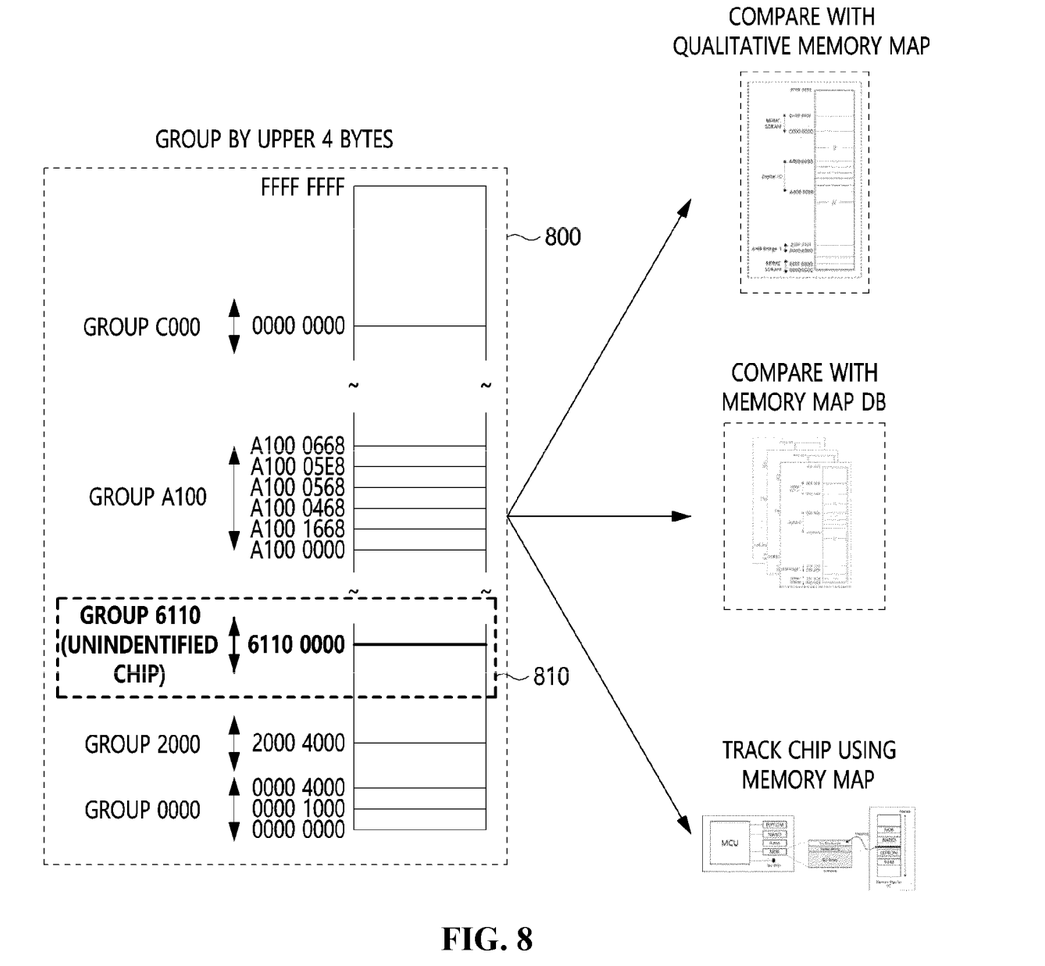
FIG. 8 is a view illustrating an example of detection of an unidentified chip using a visual analysis result according to the present invention.

For example, when the entries of the analysis list illustrated in FIG. 7 are grouped by upper four bytes, the visualized analysis result 800 that can be used by reverse engineering experts may be generated as shown in FIG. 8.

Also, although not illustrated in FIG. 1, in the method for analyzing non-informative firmware according to an embodiment of the present invention, an unidentified chip is detected based on the visualized analysis result.

Here, the unidentified chip may be detected using at least one of a method of comparing the memory map included in the visualized analysis result with a normal memory map, a method of comparing the memory map included in the visualized analysis result with a memory map database in which data is accumulated based on training, or a method of tracking an unidentified chip using the memory map included in the visualized analysis result, or a combination thereof.

For example, the visualized analysis result 800 such as that illustrated in FIG. 8 is compared with an already known normal memory map or a memory map database in which data is accumulated through training, or unidentified chip address assignment information 810 is tracked using the memory map included in the analysis result, whereby an unidentified chip may be detected.

Through the above-described method for analyzing non-informative firmware, unidentified chip detection information may be provided through firmware analysis, rather than using a physical detection method.

Also, automated analysis may be performed in order to solve a problem with manual work in reverse engineering for which a lot of time and expenses are consumed when non-informative firmware, from which a string related to a hint on a memory map is deleted, is analyzed.

Also, limitations in physical detection of an unidentified chip, which may pose a security threat, may be overcome by analyzing a memory map in firmware.

Also, a memory map included in a visualized result and analysis list may be compared with an already known normal memory map, the memory map included in the visualized result and analysis list may be compared with a database in which data is accumulated through training, and an actual unidentified chip may be tracked using the visualized result and analysis list.

Figure 9:
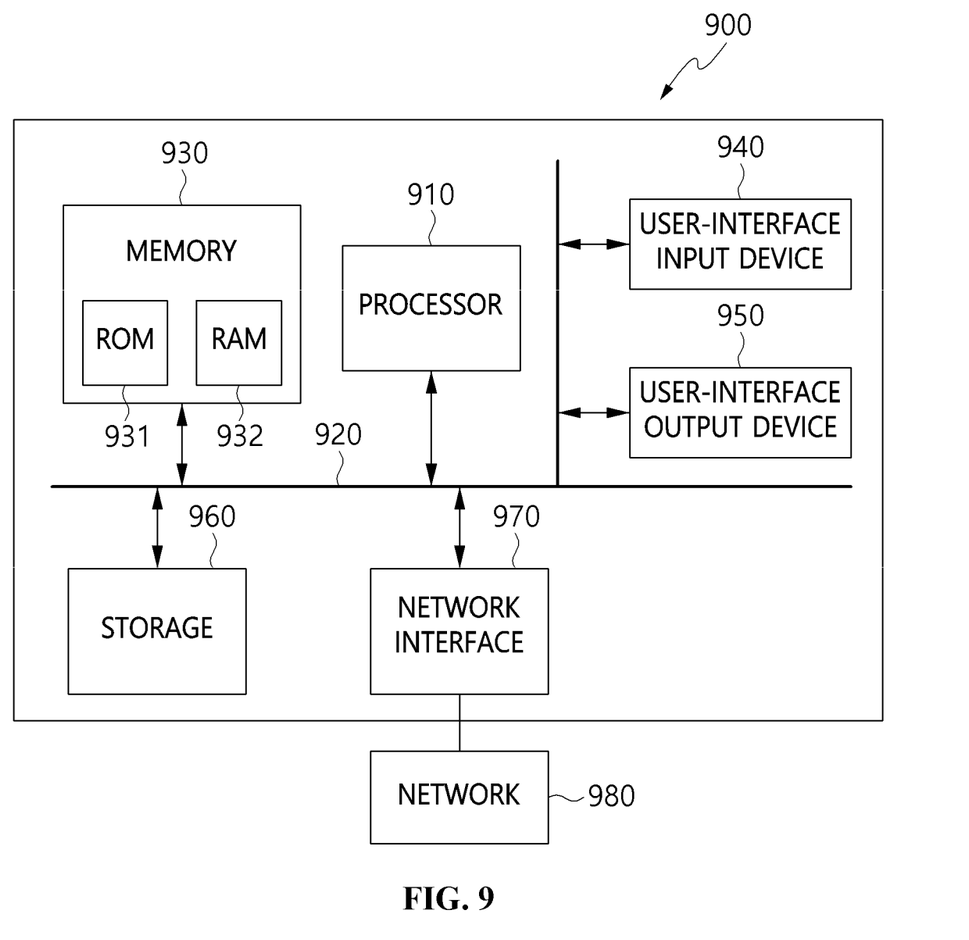
FIG. 9 is a view illustrating an apparatus for analyzing non-informative firmware according to an embodiment of the present invention.

FIG. 9 is a view illustrating an apparatus for analyzing non-informative firmware according to an embodiment of the present invention.

Referring to FIG. 9, the apparatus for analyzing non-informative firmware according to an embodiment of the present invention may be implemented in a computer system including a computer-readable recording medium. As illustrated in FIG. 9, the computer system 900 may include one or more processors 910, memory 930, a user-interface input device 940, a user-interface output device 950, and storage 960, which communicate with each other via a bus 920. Also, the computer system 900 may further include a network interface 970 connected to a network 980. The processor 910 may be a central processing unit or a semiconductor device for executing processing instructions stored in the memory 930 or the storage 960. The memory 930 and the storage 960 may be any of various types of volatile or nonvolatile storage media. For example, the memory may include ROM 931 or RAM 932.

Accordingly, an embodiment of the present invention may be implemented as a non-transitory computer-readable storage medium in which methods implemented using a computer or instructions executable in a computer are recorded. When the computer-readable instructions are executed by a processor, the computer-readable instructions may perform a method according to at least one aspect of the present invention.

The processor 910 detects a target instruction for firmware analysis in a memory map in non-informative firmware.

Here, the target instruction may be a non-informative instruction in which a string related to a hint on a memory map is not included.

Here, the target instruction may include a first instruction for executing a branch and a second instruction in which a specific value in a predefined format is used for a register operation without a description.

Here, the specific value in a predefined format may be a 4-digit or 8-digit hexadecimal number.

Also, the processor 910 generates an analysis list based on memory map information corresponding to the target instruction.

Here, the analysis list may be generated by inputting the branch target address of the first instruction and the specific value in a predefined format used in the second instruction according to the sequence order.

Also, the processor 910 groups the entries of the analysis list by preset reference bytes, thereby generating a visualized analysis result corresponding to the firmware.

Here, the visualized analysis result may be generated by grouping the entries of the analysis list by upper four bytes.

Also, the processor 910 detects an unidentified chip based on the visualized analysis result.

Here, the unidentified chip may be detected using at least one of a method of comparing the memory map included in the visualized analysis result with a normal memory map, a method of comparing the memory map included in the visualized analysis result with a memory map database in which data is accumulated based on training, or a method of tracking an unidentified chip using the memory map included in the visualized analysis result, or a combination thereof.

The memory 930 stores the analysis list and the analysis result.

Using the above-described apparatus for analyzing non-informative firmware, unidentified chip detection information may be provided through firmware analysis, rather than using a physical detection method.

Also, automated analysis may be performed in order to solve a problem with manual work in reverse engineering for which a lot of time and expenses are consumed when non-informative firmware, from which a string related to a hint on a memory map is deleted, is analyzed.

Also, limitations in physical detection of an unidentified chip, which may pose a security threat, may be overcome by analyzing a memory map in firmware.

Also, a memory map included in a visualized result and analysis list may be compared with an already known normal memory map, the memory map included in the visualized result and analysis list may be compared with a database in which data is accumulated through training, and an actual unidentified chip may be tracked using the visualized result and analysis list.

According to the present invention, unidentified chip detection information may be provided through firmware analysis without using a physical detection method.

Also, the present invention may perform automated analysis in order to solve the problem with manual work in reverse engineering, which consumes a lot of time and expenses when non-informative firmware, from which a string related to a hint on a memory map is deleted, is analyzed.

Also, the present invention performs analysis on a memory map in firmware, thereby overcoming limitations in physical detection of an unidentified chip, which may pose a security threat.

Also, the present invention may compare a memory map acquired using a visualized result and analysis list with an already known normal memory map, compare the same with a database in which data is accumulated through training, and track an actual unidentified chip using the visualized result and analysis list.

As described above, the apparatus for analyzing non-informative firmware and the method using the same according to the present invention are not limitedly applied to the configurations and operations of the above-described embodiments, but all or some of the embodiments may be selectively combined and configured, so the embodiments may be modified in various ways.

What is claimed is:

1. A method for analyzing non-informative firmware, comprising:
   detecting a target instruction for firmware analysis in a memory map in non-informative firmware;
   generating an analysis list based on memory map information corresponding to the target instruction; and
   generating a visualized analysis result corresponding to the firmware by grouping entries of the analysis list by preset reference bytes,
   wherein the target instruction is a non-informative instruction in which a string related to a memory map hint is not included, and includes a first instruction for executing a branch and a second instruction in which a specific value in a predefined format is used for a register operation without any description, and
   wherein the analysis list is generated by inputting a branch target address of the first instruction and the specific value in the predefined format used in the second instruction according to a sequence order.

2. The method of claim 1, wherein the specific value in the predefined format is a 8-digit or 4-digit value corresponding to a hexadecimal number.

3. The method of claim 1, further comprising:
   detecting an unidentified chip based on the visualized analysis result.

4. The method of claim 3, wherein the unidentified chip is detected using at least one of a method of comparing a memory map included in the visualized analysis result with a normal memory map, a method of comparing the memory map included in the visualized analysis result with a memory map database accumulated based on training, or a method of tracking an unidentified chip using the memory map included in the visualized analysis result, or a combination thereof.

5. The method of claim 1, wherein the visualized analysis result is generated by grouping the entries of the analysis list by upper four bytes.

6. An apparatus for analyzing non-informative firmware, comprising:
   a processor for detecting a target instruction for firmware analysis in a memory map in non-informative firmware, generating an analysis list based on memory map information corresponding to the target instruction, and generating a visualized analysis result corresponding to the firmware by grouping entries of the analysis list by preset reference bytes; and
   memory for storing the analysis list and the analysis result,
   wherein the target instruction is a non-informative instruction in which a string related to a memory map hint is not included, and includes a first instruction for executing a branch and a second instruction in which a specific value in a predefined format is used for a register operation without any description, and
   wherein the analysis list is generated by inputting a branch target address of the first instruction and the specific value in the predefined format used in the second instruction according to a sequence order.

7. The apparatus of claim 6, wherein the specific value in the predefined format is a 8-digit or 4-digit value corresponding to a hexadecimal number.

8. The apparatus of claim 6, wherein the processor detects an unidentified chip based on the visualized analysis result.

9. The apparatus of claim 8, wherein the processor detects the unidentified chip using at least one of a method of comparing a memory map included in the visualized analysis result with a normal memory map, a method of comparing the memory map included in the visualized analysis result with a memory map database accumulated based on training, or a method of tracking an unidentified chip using the memory map included in the visualized analysis result, or a combination thereof.

10. The apparatus of claim 6, wherein the visualized analysis result is generated by grouping the entries of the analysis list by upper four bytes.

* * * * *